No. 797,606. PATENTED AUG. 22, 1905.
T. D., J. C. & H. A. PRESCOTT.
TURBINE.
APPLICATION FILED OCT. 14, 1904.
2 SHEETS—SHEET 1.
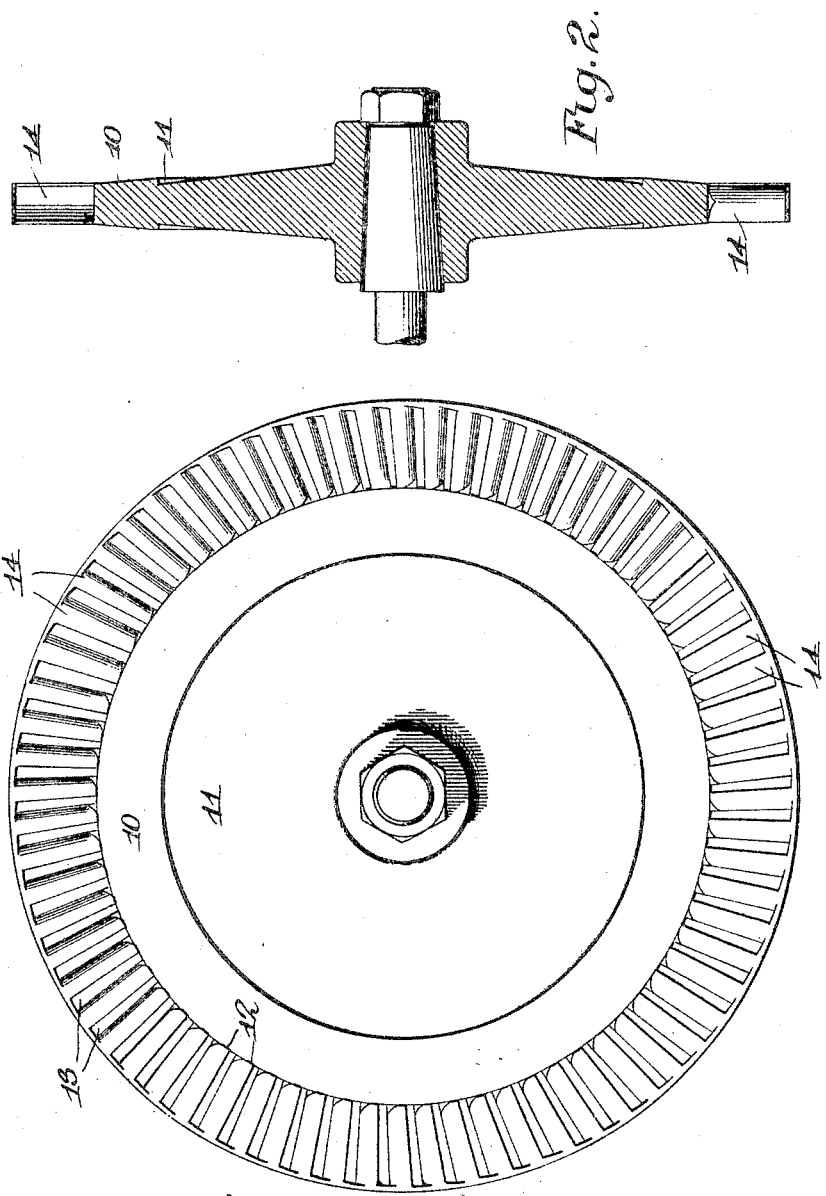
Witnesses
Thomas D. Prescott,
James C. Prescott and
Henry A. Prescott, Inventors.
by C. A. Snow & Co.
Attorneys

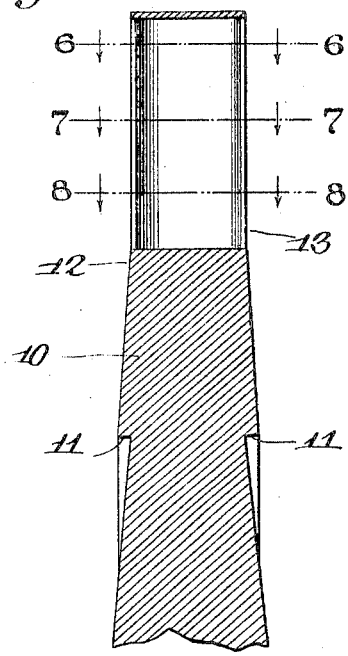
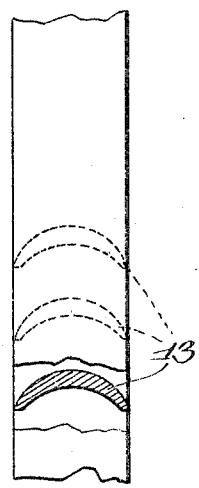
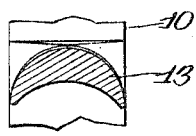
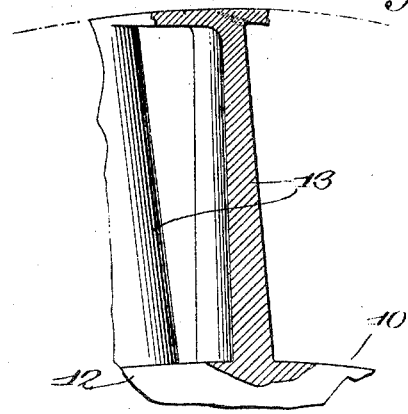

UNITED STATES PATENT OFFICE.

THOMAS D. PRESCOTT, JAMES C. PRESCOTT, AND HENRY A. PRESCOTT, OF PHILADELPHIA, PENNSYLVANIA.

TURBINE.

No. 797,606.          Specification of Letters Patent.          Patented Aug. 22, 1905.

Application filed October 14, 1904. Serial No. 228,458.

*To all whom it may concern:*

Be it known that we, THOMAS D. PRESCOTT, JAMES C. PRESCOTT, and HENRY A. PRESCOTT, citizens of the United States, residing at Philadelphia, in the county of Philadelphia and State of Pennsylvania, have invented a new and useful Turbine, of which the following is a specification.

This invention relates to turbines, and has for its principal object to provide a novel form of disk turbine having integral blades at its periphery, the extreme end portions of the blades being united to form a continuous annular web for the purpose of strengthening the structure.

A further object of the invention is to construct a turbine having integral blades extending from its periphery, all of the blades being tapering from root to crown and both sides of each blade being arranged on non-radial lines.

With these and other objects in view, as will more fully hereinafter appear, the invention consists in the novel construction and arrangement of parts hereinafter fully described, illustrated in the accompanying drawings, and particularly pointed out in the appended claims, it being understood that various changes in the form, proportions, size, and minor details of structure may be made without departing from the spirit or sacrificing any of the advantages of the invention.

Figure 1 is a side elevation of a turbine-disk constructed in accordance with the invention. Fig. 2 is a transverse sectional elevation of the same on the line 2 2 of Fig. 1. Fig. 3 is a detail sectional view of a portion of the perimeter of the disk drawn to an enlarged scale. Fig. 4 is a plan view of the same. Fig. 5 is a longitudinal sectional elevation of one of the blades on the line 5 5 of Fig. 3. Figs. 6, 7, and 8 are sectional plan views of one of the blades on the lines bearing corresponding reference-numerals in Fig. 3.

Similar numerals of reference indicate corresponding parts in each of the several figures of the drawings.

The body 10 of the disk is formed of any suitable metal, and its opposite sides are recessed, forming extended shoulders 11, from the outer edges of which the disk gradually tapers to the perimeter 12 of the solid portion of the disk, and from this perimeter extend the blades 13.

Each blade 13 is formed integral with the metal of the disk and gradually tapers in thickness from the root to the crown, as will be seen more clearly on reference to Figs. 6, 7, and 8, and said blades are arranged on curved lines, both the front and rear face being curved transversely of the blade, the curved rear faces forming impact-surfaces for the steam or other actuating fluid. In order to gain the best effect from the impact of the actuating fluid, both the front and rear edges of the blade are arranged on non-radial lines, both lines if continued within the body of the disk passing to the same side of the center of the disk, and this serves to form an inclined impact-face by which the jet or jets of steam will be drawn somewhat toward the center of the disk, and the tendency to outward movement from centrifugal force will be to some extent neutralized.

In devices of this class as ordinarily constructed the blades are formed each of a separate piece of metal or the body of the disk is cut by means of suitable tools in order to form a structure in which the outer edges of the blades are united by means of a continuous web or rim of metal. In the first of these the construction is weak and there is a constant tendency to displacement or disarrangement of the blades, and in the second instance the construction is expensive. In the present case these difficulties are overcome by first forming the blades with thin outer ends and afterward bending down the outer ends of all of the blades in the same direction, so that one blade shall overlap the other, as indicated more clearly in Figs. 1 and 5, thus forming a continuous web in which each blade serves as a brace for the others. The edge of each blade is brazed or otherwise united to the blade immediately to the rear, this operation being accomplished by any suitable tool and while the metal is either cold or heated. After this operation the so-formed continuous web may be pressed down in order that any projections may not interfere with the rotative movement of the disk.

For the purpose of strengthening the connection between the roots of the blades and the body of the disk enough metal is left at the root to form fillets 16, that extend in curved lines from the median line of the rear of the tooth to the opposite edges of the disk.

Having thus described the invention, what is claimed is—

1. A turbine-disk having integral tapered blades disposed on non-radial lines, the lines of the front and rear walls of each blade passing to the same side of the center of the disk.

2. A turbine-disk having blades of an initial width greater than the width of the disk proper, the sides of the blades being inturned to a position approximately in alinement with the sides of the disk, and the ends of said blades being overlapped and united to form a continuous rim.

3. A turbine-blade having one concave wall and one convex wall, there being strengthening fillets or ribs projecting from the convex wall to the root or base of the blade, the outer end of said blade being bent in a direction substantially at a right angle to the length of the blade.

In testimony that we claim the foregoing as our own we have hereto affixed our signatures in the presence of two witnesses.

THOMAS D. PRESCOTT.
JAMES C. PRESCOTT.
HENRY A. PRESCOTT.

Witnesses:
F. J. KING,
ROBERT MAIR.